US009810187B2

(12) United States Patent
Bolz et al.

(10) Patent No.: US 9,810,187 B2
(45) Date of Patent: Nov. 7, 2017

(54) CIRCUIT ARRANGEMENT FOR INDUCTIVELY HEATING A FUEL INJECTOR VALVE

(71) Applicant: CONTINENTAL AUTOMOTIVE GMBH, Hannover (DE)

(72) Inventors: Stephan Bolz, Ruhpolding (DE); Martin Goetzenberger, Ingolstadt (DE)

(73) Assignee: Continental Automotive GmbH, Hanover (DE)

( * ) Notice: Subject to any disclaimer, the term of this patent is extended or adjusted under 35 U.S.C. 154(b) by 373 days.

(21) Appl. No.: 14/424,516

(22) PCT Filed: Aug. 8, 2013

(86) PCT No.: PCT/EP2013/066652

§ 371 (c)(1),
(2) Date: Feb. 27, 2015

(87) PCT Pub. No.: WO2014/032935

PCT Pub. Date: Mar. 6, 2014

(65) Prior Publication Data

US 2015/0240766 A1 Aug. 27, 2015

(30) Foreign Application Priority Data

Aug. 28, 2012 (DE) ........................ 10 2012 215 264

(51) Int. Cl.
*H05B 6/06* (2006.01)
*B05B 1/24* (2006.01)
(Continued)

(52) U.S. Cl.
CPC ............ *F02M 53/06* (2013.01); *F02D 41/20* (2013.01); *H05B 6/06* (2013.01)

(58) Field of Classification Search
CPC ........... F02D 41/20; F02M 53/06; H05B 6/06
(Continued)

(56) References Cited

U.S. PATENT DOCUMENTS 6,249,418 B1 6/2001 Bergstrom
7,628,340 B2 * 12/2009 Czimmek .............. F02D 41/20 239/135

(Continued)

FOREIGN PATENT DOCUMENTS

CN 101232753 A 7/2008
DE 102010063112 A1 6/2012

(Continued)

*Primary Examiner* — Quang Van
(74) *Attorney, Agent, or Firm* — Laurence A. Greenberg; Werner H. Stemer; Ralph E. Locher

(57) ABSTRACT

A circuit configuration for inductively heating a fuel injector, includes an injection valve heater coil having connections forming first and second nodes, a capacitor connected parallel to the heater coil, a first inductor connected between a positive pole of a supply voltage and the first node, a second inductor connected between the positive pole of the supply voltage and the second node, a first controllable switching element connected between the first node and a negative pole of the supply voltage, a second controllable switching element connected between the second node and the negative pole of the supply voltage, and a control unit connected to control inputs of the switching elements for applying a switch-on level to the control inputs when the voltage at the respective node connected to a switching element becomes 0 and for dimensioning a switch-on duration of the switching element according to a preset heating power.

7 Claims, 4 Drawing Sheets

(51) Int. Cl.
*H02M 7/537* (2006.01)
*H05B 3/02* (2006.01)
*F02M 53/06* (2006.01)
*F02D 41/20* (2006.01)

(58) Field of Classification Search
USPC ....... 219/662, 661, 660, 628, 638, 624, 672; 331/186, 117 R, 117 FE, 46, 175; 363/131, 89, 17, 126, 127; 239/135
See application file for complete search history.

(56) References Cited

U.S. PATENT DOCUMENTS

| | | | | |
|---|---|---|---|---|
| 2007/0200006 | A1 | 8/2007 | Czimmek | |
| 2010/0288755 | A1 | 11/2010 | Czimmek | |
| 2011/0242868 | A1 * | 10/2011 | Gray | H02M 7/537 363/131 |
| 2014/0308030 | A1 * | 10/2014 | Bolz | F02D 41/20 392/465 |

FOREIGN PATENT DOCUMENTS

| | | | |
|---|---|---|---|
| DE | 102011085085 | B4 | 4/2014 |
| WO | 0045403 | A1 | 8/2000 |
| WO | 2012080009 | A1 | 6/2012 |

* cited by examiner

CIRCUIT ARRANGEMENT FOR INDUCTIVELY HEATING A FUEL INJECTOR VALVE

BACKGROUND OF THE INVENTION

Field of the Invention

The invention relates to a circuit arrangement for inductively heating a fuel injection valve comprising a heater coil of the injection valve, the connections of said heater coil forming a first node and a second node, comprising a capacitor, which is connected in parallel with the heater coil, comprising a first inductance, which is connected between the positive terminal of a supply voltage and the first node, comprising a second inductance, which is connected between the positive terminal of the supply voltage and the second node, comprising a first controllable switching element, which is connected between the first node and the negative terminal of the supply voltage, and comprising a second controllable switching element, which is connected between the second node and the negative terminal of the supply voltage.

Such a circuit arrangement is described in DE 10 2011 085 085.6, not previously published. In the case of the resonant power output stage therein, the control inputs of the switching elements are each connected, via a diode polarized in the forward direction, to the node which is connected to the negative terminal of the supply voltage via the respective other switching element. This means that, after a polarity reversal operation of the parallel resonant circuit comprising the heater coil and the capacitor, one switching element is switched on and the respective other switching element is switched off when the voltage at the node assigned to the switching element to be switched on is approximately 0 volt. As a result, losses in the switching elements are very low and the resonant power output stage has a high degree of efficiency.

One disadvantage with this, however, consists in that the output heater power increases quadratically as the supply voltage increases. In a motor vehicle, there is a supply from the vehicle electrical distribution system, wherein the nominal vehicle electrical distribution system voltage of 12 volts can decrease to 9 volts when the battery is cold and the internal combustion engine is at a standstill under load, and maximum voltages of up to 16 volts can occur. If the heater winding and the resonant frequency are configured for 200 watts in the case of a 9 volt supply voltage, for example, the heater power will correspondingly be 620 watts on 16 volts. In order to maintain a certain preset temperature in the fuel by means of regulation, the power regulation can take place by switching-on or switching-off of the output stages. This is acceptable in view of the comparatively high thermal time constants of the heating element and the heated fuel, but the power component parts in the output stages need to be designed for the much higher output power. This over dimensioning has a disadvantageous effect in respect of high costs for the power electronics.

BRIEF SUMMARY OF THE INVENTION

Therefore, the object of the invention consists in avoiding this disadvantage.

The object is achieved by a circuit arrangement for inductively heating a fuel injection valve comprising an injection valve heater coil having connections forming a first node and a second node, a capacitor connected in parallel with the heater coil, a first inductance connected between a positive terminal of a supply voltage and the first node, a second inductance connected between the positive terminal of the supply voltage and the second node, a first controllable switching element connected between the first node and a negative terminal of the supply voltage, and a second controllable switching element connected between the second node and the negative terminal of the supply voltage. Advantageous developments are specified in the dependent claims.

In accordance with the invention, the circuit arrangement has a control unit, which is connected to the control inputs of the controllable switching elements and is designed to apply a respective switch-on level to said switching elements when the voltage at the respective node, to which a respective switching element is connected, becomes 0 volt, and to dimension the switch-on duration of a respective switching element in accordance with a preset heating power.

By omitting the diodes which cross-couple the switching elements, resonant polarity reversal is prevented and, instead, the polarity reversal of the resonant circuit is initiated by targeted switching-on and switching-off of the switching elements owing to the external control by the control unit. Owing to the external control of the switching elements in accordance with the invention, the heater power can be increased within a wide range starting from a minimum value. If the heater power is set at 200 watts for a 16 volt supply voltage, for example, the heater power can be kept constant at 200 watts down to 9 volts.

Advantageously, the external control takes place by means of two actuation signals in phase opposition for the two switching elements, wherein the switch-off duration corresponds to the polarity reversal duration of the resonant circuit formed by the circuit arrangement. The resonant frequency is in this case determined by the capacitance of the capacitor, the inductance of the heater coil, the effective heater resistance and the first and second inductances. The switch-on duration, on the other hand, is varied in accordance with the invention depending on the present value of the supply voltage. At the maximum voltage of 16 volts, for example, it corresponds to the switch-off duration, with the result that the signal from the external controller has a duty factor of 50%. The frequency in this case corresponds to the resonant frequency of the abovementioned resonant circuit. A control period duration for a switching element results in this case from the sum of a switch-on duration and a switch-off duration.

In an advantageous development of the invention, the control unit is designed to generate the switch-on level for the first switching element at the time at which half the control period for the second switching element elapses, and vice versa. By virtue of this differential-mode actuation, a reduction in the current ripple of the supply current is achieved.

Owing to the external control of the circuit arrangement in accordance with the invention, the switch-on duration can be increased as the supply voltage decreases with the switch-off duration remaining the same.

As a result, the first and second inductances are charged to a higher current value so that more energy is transmitted into the resonant circuit and therefore into the heater inductance during a resonant polarity reversal operation during the following switch-off phase. In a manner in accordance with the invention, therefore, the heater power can be increased within a wide range owing to the extension of the switch-on phase. The resonant polarity reversal operation required for the high degree of efficiency is maintained since a switch-on level is only applied to a switching element when the voltage at the respective node to which a respective switching element is connected becomes 0 volt.

In an advantageous development of the circuit arrangement, a third controllable switching element is arranged between the positive terminal of the supply voltage and the node between the first and second inductances, by means of which third controllable switching element the electrical connection of the nodes to the positive terminal of the supply voltage can be interrupted. As a result, in an advantageous manner it is possible to prevent the possibility of a short circuit in one of the lines with which the heater coil is connected to the nodes to ground resulting in a high current flow through the first and second inductances. If such a short circuit is detected, a further current flow can be suppressed by actuation of the third switching element.

In a further development of the circuit arrangement according to the invention, a first diode as freewheeling diode for the inductances is arranged between the node between the first and second inductances and the negative terminal of the supply voltage. This first diode serves the purpose of enabling demagnetization of the inductances during normal operation in the case of an interruption to the supply to the first and second switching elements.

In a further development of the circuit arrangement, a field-effect transistor comprising a substrate diode is arranged between the positive terminal of the supply voltage and the node between the first and second inductances in such a way that the substrate diode is polarized in the forward direction. As a result, polarity reversal protection is realized. If the battery terminals are inadvertently swapped over, a current path is formed from ground through the substrate diodes of the first and second switching means, if said switching means are in the form of power field-effect transistors, and the first and second inductances towards the battery potential, which is now negative. In this case too, the high current flow occurring would certainly destroy the electronic component parts. Since the substrate diode of the field-effect transistor which is subject to polarity reversal in the normal case now turns off, however, this current flow is safely suppressed and damage is avoided.

In a development of the circuit arrangement according to the invention, a fourth controllable switching element is arranged between the positive terminal of the supply voltage and the first inductance, and a fifth controllable switching element is arranged between the positive terminal of the supply voltage and the second inductance. In addition, a second diode is arranged between the node of the fourth switching element and the negative terminal of the supply voltage, and a third diode is arranged between the node of the fifth switching element and the negative terminal of the supply voltage, in each case in the reverse direction. The control unit is connected to the control inputs of the fourth and fifth controllable switching elements and is designed to apply a respective switch-off level to said switching elements at preset times depending on the power to be transmitted to the heater coil.

The fourth and fifth controllable switching elements form, together with the second and third diodes and the first and second inductances, in each case a buck converter. As a result, on suitable actuation, the effective supply voltage available for the first and second switching means can be decreased from the maximum voltage down to 0 volt. Correspondingly, the heater power can thus be reduced from a maximum value preset by the supply voltage down to virtually 0 watt. The signals at the control inputs of the fourth and fifth switching elements in this case preferably have the same frequency and also the same duty factor, but the phase angle of said signals is phase-shifted through 180 degrees in order to keep the current ripple of the supply current low. Synchronization with the external control signals for the first and second switching elements is also expedient.

In a further advantageous development of the previously described circuit arrangement, a field-effect transistor comprising a substrate diode is arranged between the positive terminal of the supply voltage and the node between the fourth switching element and the fifth switching element in such a way that the substrate diode is polarized in the forward direction in order to provide polarity reversal protection in this case as well.

BRIEF DESCRIPTION OF THE SEVERAL VIEWS OF THE DRAWING

The invention will be described in more detail below with reference to exemplary embodiments with the aid of figures, in which.

DESCRIPTION OF THE INVENTION

Figure 1:
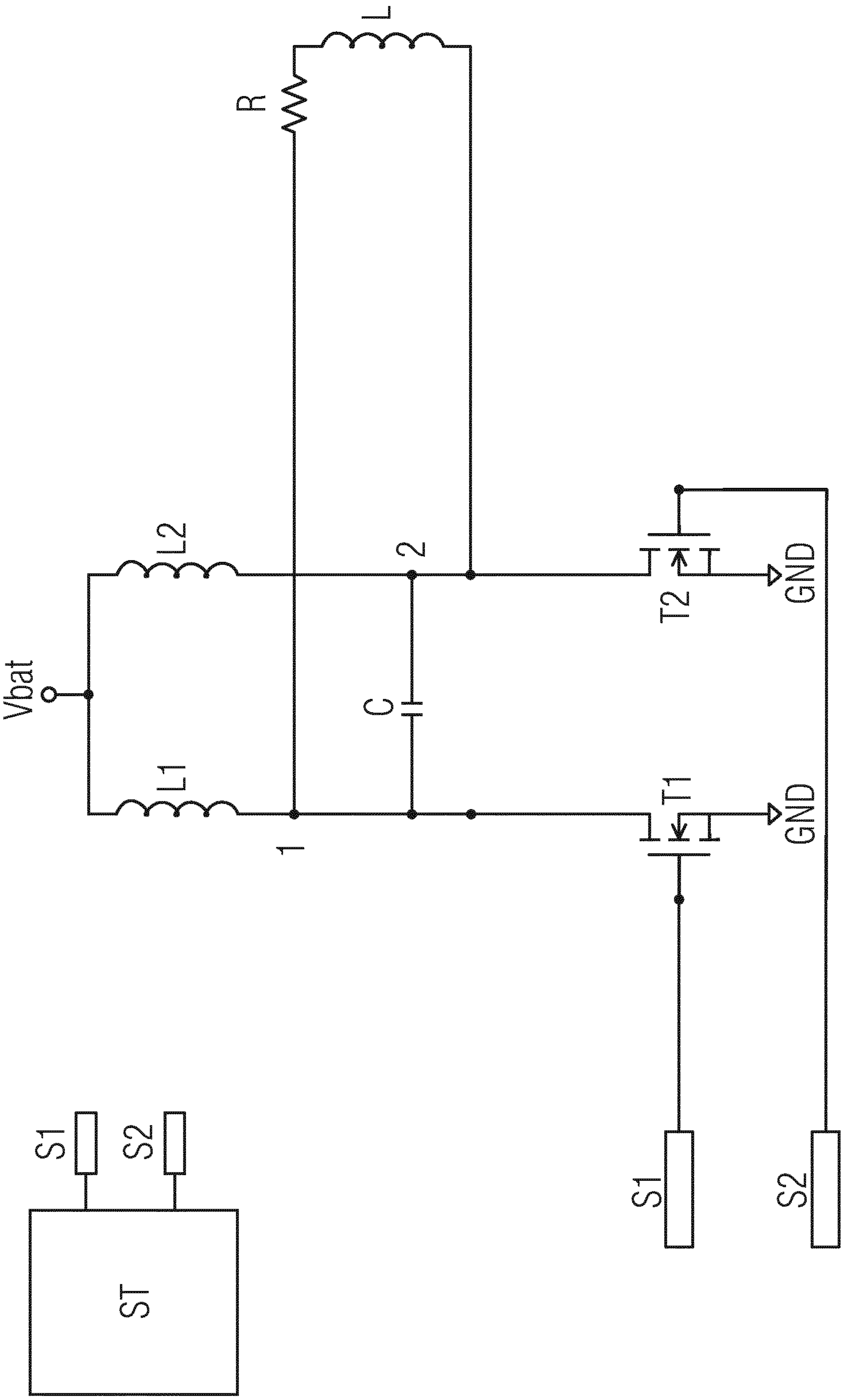
FIG. 1 shows a first basic illustration of a circuit arrangement according to the invention.

In FIG. 1, a first series circuit comprising a first inductance L1 and a first switching means T1 in the form of an n-channel field-effect transistor and a second series circuit comprising a second inductance L2 and a second switching means T2, which is likewise in the form of an n-channel field-effect transistor, are connected between the positive and negative terminals of a supply voltage Vbat, GND in a circuit arrangement for inductively heating a fuel injection valve. The nodes between the first inductance L1 and the first switching means T1 and the second inductance L2 and the second switching means T2 are referred to as first and second nodes 1, 2.

Firstly a capacitor C and secondly a heater coil L, with which an ohmic resistor R is connected in series in order to indicate the effective losses, are connected between the first and second nodes 1, 2. The control connections of the first and second switching means T1, T2 are connected to a schematically illustrated control unit ST, as is shown by the control signals S1 and S2 to be transmitted from the control unit ST to the switching means.

Figure 4:
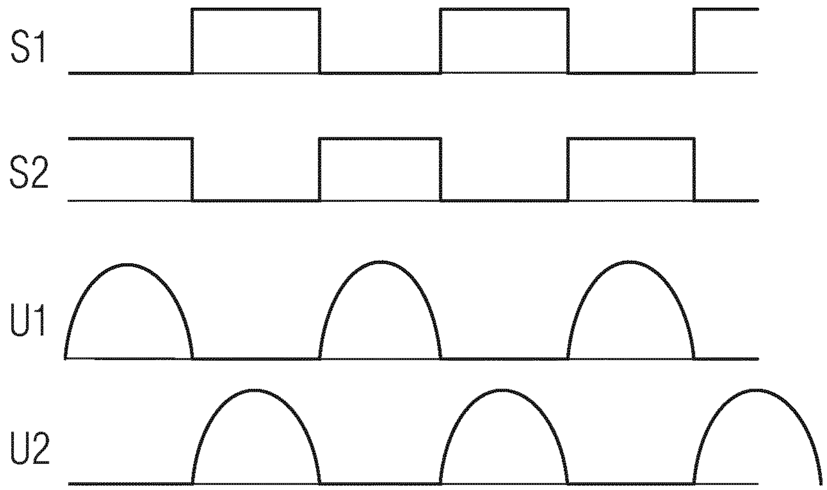
FIG. 4 shows signal profiles at a circuit arrangement according to the invention with a duty factor of the control signals of 50%.
Figure 5:
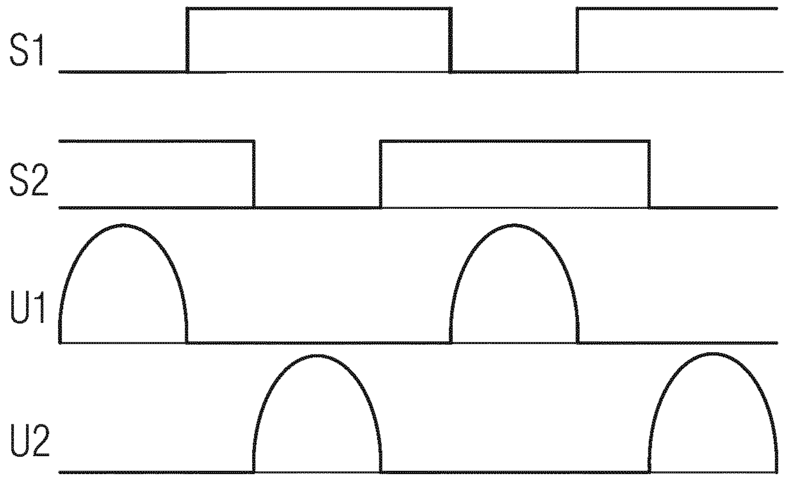
FIG. 5 shows the profiles of the same signals at a lower duty factor.

The control signals at the control inputs of the first and second switching means T1, T2 and the voltage levels resulting therefrom at the nodes 1 and 2 are illustrated in FIGS. 4 and 5 for different time sequences of the control signals S1, S2. When the first control signal S1 by a suitable switch-on level, which, in the example illustrated in FIGS. 4 and 5, is a high level in the case of the selected n-channel field-effect transistor for the first switching means T1, the first switching means T1 is switched on and at the same time the second switching means T2 is switched off via a complementary signal level, which is a low level in the example illustrated. As a result, the capacitor C can be charged via the second inductance L2, with the result that the voltage U2 at the second node 2 increases, as can be seen from FIG. 4.

Once the voltage U2 at the second node 2 has reached its maximum value, the capacitor C is discharged via the heater coil LH, with the result that the fuel injection valve in which the heater coil LH is installed, and as a result also the fuel contained therein, is heated.

At the time at which the capacitor C has discharged and, as a result, the voltage at the second node 2 has reached 0 volt, which can be determined, for example, by a suitable shunt in series with the second switching means T2, the first switching means T1 is switched off by a corresponding low level, and the second switching means T2 is switched on by a high level, which is complementary thereto. The switchover at this time enables operation with a high degree of efficiency since only a small amount of energy is dissipated in the switching means T1, T2 in this way. As a result of the switchover, the capacitor C is now charged via the first inductance L1, with the result that the voltage U1 at the first node 1 increases until it decreases again once a maximum value has been reached since the capacitor C is in turn discharged via the heater coil LH. Once the voltage at the first node 1 has again reached 0 volt, the switching means T1, T2 are switched on or off again by corresponding switch-on and switch-off levels. As long as it is intended for there to be heating, this operation continues periodically. The duration of a polarity reversal operation illustrated in FIG. 4 is determined by the resonant frequency of the circuit arrangement, in particular the values for the capacitor C, the heater coil LH and the effective heating resistance RL and the first and second inductances L1, L2.

In the example illustrated of control signals S1, S2, which have a duty factor of 50% and are in phase opposition, the sequence corresponds to the resonant polarity reversal as is known from the prior art by cross-coupling via diodes of the switching means T1, T2.

However, owing to the active actuation of the switching means T1, T2 according to the invention, it is now possible to extend the switch-on phase of the respective switching means T1, T2, as shown in FIG. 5, so that additional energy can be stored in the first and second inductances L1, L2 during the times in which both switching means T1, T2 are activated, which results in an increased energy transfer to the heater coil LH during the polarity reversal operation, which takes place during a switch-off phase of a switching means T1 or T2, which can be seen from FIG. 5 from relatively high voltages U1, U2 at the nodes 1 and 2, respectively.

In FIG. 5, the control signals S1 and S2 are selected in phase opposition, which results in a uniform polarity reversal in the parallel resonant circuit comprising the capacitor C and the heater coil LH. As a result, a reduction in the ripple in the current which is provided by the supply voltage Vbat is achieved.

If the signal waveform shown in FIG. 4 for the control signals S1 and S2 is selected at the maximum supply voltage Vbat, an increase in the power to be transmitted into the heater coil LH can be achieved by extending the switch-on phases of the switching means T1, T2, with the result that, by virtue of the actuation according to the invention of the circuit arrangement according to the invention, it is possible to keep the power to be transmitted constant at a low supply voltage Vbat.

Figure 2:
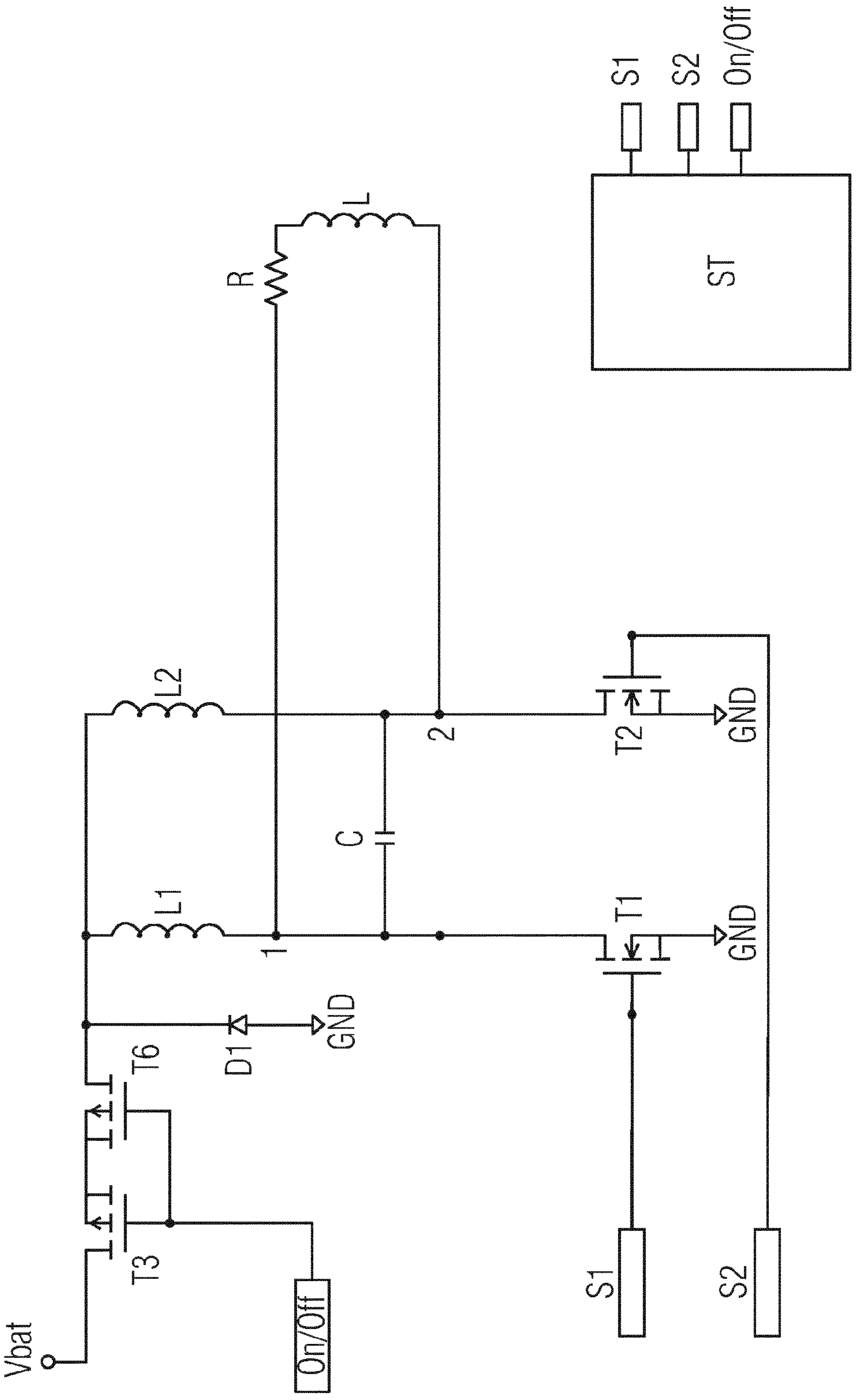
FIG. 2 shows an advantageous development of the circuit arrangement shown in FIG. 1.

FIG. 2 shows an extension of the circuit arrangement shown in FIG. 1 by a third switching means T3, which is arranged between the positive terminal of the supply voltage Vbat and the node between the first and second inductances L1, L2. It is thus possible to activate or deactivate the circuit arrangement by means of the control unit ST and a suitable signal on/off. This is necessary since, otherwise, in the event of a short circuit in one of the connecting lines to the heater coil LH, a high current could flow via the inductances L1 or L2 from the node 1 or 2 to ground and, as a result, parts of the electronics could be destroyed. By virtue of detection of such a short circuit and subsequent deactivation of the circuit arrangement, this can be prevented.

FIG. 2 also illustrates a sixth switching means T6, which is connected in series with the third switching means T3 and is in the form of a p-channel field-effect transistor with an intrinsic diode (not illustrated) and which is connected with “polarity reversal”, with the result that, in the switched-off state, with polarity reversal of the battery and at a corresponding negative potential at the connection Vbat, no current can flow via the first and second inductances L1, L2 and the first and second switching means T1, T2, which likewise comprise substrate diodes. Advantageously, the control connections of the third and sixth switching means T3, T6 are connected to one another so that they can be switched on and off jointly.

In order to be able to enable decay of the magnetic field stored in the first and second inductances L1, L2 during normal operation, i.e. when one of the two switching means T1, T2 is switched on, on deactivation by means of the third switching means T3, a first diode D1 is arranged in the reverse direction between the node between the first and second inductances L1, L2 and the negative terminal of the supply voltage GND. Said first diode acts for this case as freewheeling diode for the first and second inductances L1 and L2.

Figure 3:
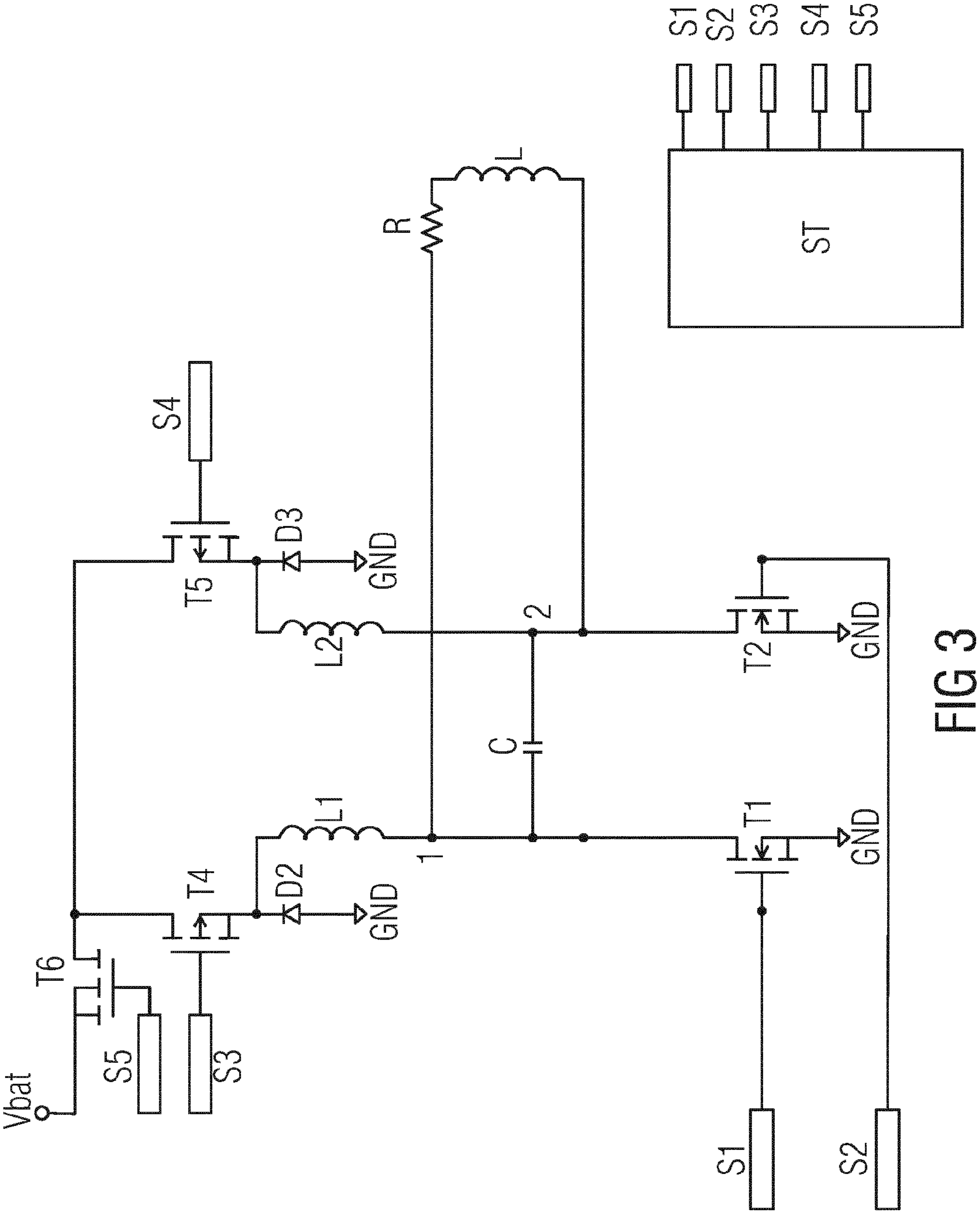
FIG. 3 shows a second embodiment of a circuit arrangement according to the invention.

FIG. 3 illustrates an extension according to the invention of the circuit arrangement shown in FIG. 1. In said figure, the first inductance L1 is firstly connected to the first node 1 and secondly connected, via a second diode D2 polarized in the reverse direction, to the negative terminal of the supply voltage GND and, via a fourth controllable switching means T4, which is in the form of a p-channel field-effect transistor in the example illustrated, to the positive potential Vbat of the supply voltage. In the same way, the second inductance L2 is connected firstly to the second node 2 and secondly via a third diode D3 polarized in the reverse direction to the negative terminal of the supply voltage and via a fifth switching means T5, which is likewise in the form of a p-channel field-effect transistor, to the positive terminal Vbat of the supply voltage.

Control signals S3, S4 from the control unit ST are applied to the control inputs of the fourth and fifth switching means T4, T5. This is illustrated schematically in FIG. 3 by corresponding symbols. In the same way as in the exemplary embodiment shown in FIG. 2, a p-channel field-effect transistor T6 is “connected” “with polarity reversal” as polarity reversal protection means between the node between the fourth and fifth switching means T4, T5 and the positive terminal of the supply voltage Vbat, with the result that it would turn off in the switched-off state in the event of a supply voltage with reversed polarity and operation of the circuit arrangement would not be possible. The control connection of said p-channel field-effect transistor is connected to the control unit ST in order for a signal S5 to be applied to said control connection.

The fourth switching means T4, the second diode D2 and the first inductance L1, firstly, and the fifth switching means T5, the third diode D3 and the second inductance L2, secondly, form a first and a second buck converter, respectively, by means of which a reduction in the power supplied to the circuit arrangement can be achieved by suitable control signals S3 and S4 at the control inputs of said switching means in order to be able to additionally influence the energy supplied to the heater coil LH in this way. The control signals S3 and S4 preferably have the same frequency and also the same duty factor, but the phase angle of said control signals is shifted through 180 degrees in order to keep the current ripple of the current from the supply voltage source low. Synchronization with the control signals S1 and S2 for the first and second switching means T1, T2 is also expedient.

If both the control signals S3 and S4 in the case of the p-channel field effect transistors selected in FIG. 3 have a low level, so that the transistors are switched on, the supply voltage is available and the heating power can reach the maximum value. If the two control signals S3 and S4 have a high level, the fourth and fifth switching means T4, T5, which are in the form of p-channel field-effect transistors, are switched off in the steady state and the heater power is zero.

Furthermore, short-circuit protection to ground is thus realized without any additional complexity. By switching off the fourth and fifth switching means T4, T5 in a suitable manner at suitable times, the heater power and also the current ripple in the supply current can be influenced in a predetermined manner.

The invention claimed is:

1. A circuit configuration for inductively heating a fuel injection valve, the circuit configuration comprising:

an injection valve heater coil having connections forming a first node and a second node;

a capacitor connected in parallel with said heater coil;

a first inductance connected between a positive terminal of a supply voltage and said first node;

a second inductance connected between the positive terminal of the supply voltage and said second node;

a first controllable switching element connected between said first node and a negative terminal of the supply voltage, said first controllable switching element having a control input;

a second controllable switching element connected between said second node and the negative terminal of the supply voltage, said second controllable switching element having a control input; and a control unit connected to said control inputs of said controllable switching elements, said control unit applying a respective switch-on level to said controllable switching elements when a voltage at a respective node to which a respective switching element is connected becomes 0 volt and dimensioning a switch-on duration of the respective switching element in accordance with a preset heating power.

2. The circuit configuration according to claim 1, wherein:

said switch-on duration of said switching elements is determined by a period of a resonant oscillation of the circuit configuration;

a control period for a switching element results from a sum of the switch-on duration and a switch-off duration; and said control unit generates said switch-on level for said first switching element at a time at which half of a control period for said second switching element elapses, and said control unit generates said switch-on level for said second switching element at a time at which half of a control period for said first switching element elapses.

3. The circuit configuration according to claim 1, which further comprises:

a node connected between said first and second inductances; and a third controllable switching element connected between the positive terminal of the supply voltage and said node connected between said first and second inductances, said third controllable switching element configured to interrupt an electrical connection between said first and second nodes and the positive terminal of the supply voltage.

4. The circuit configuration according to claim 3, which further comprises a first diode connected between said node connected between said first and second inductances and the negative terminal of the supply voltage.

5. The circuit configuration according to claim 3, which further comprises a field-effect transistor forming a substrate diode connected between the positive terminal of the supply voltage and said node connected between said first and second inductances, said substrate diode being polarized in the forward direction.

6. The circuit configuration according to claim 1, which further comprises:

a fourth controllable switching element connected between the positive terminal of the supply voltage and said first inductance, said fourth controllable switching element having a control input;

a fifth controllable switching element connected between the positive terminal of the supply voltage and said second inductance, said fifth controllable switching element having a control input;

a node connected to said fourth controllable switching element;

a second diode connected in a reverse direction between said node connected to said fourth controllable switching element and the negative terminal of the supply voltage;

a node connected between said fifth controllable switching element; and a third diode connected in the reverse direction between said node connected to said fifth controllable switching element and the negative terminal of the supply voltage;

said control unit being connected to said control inputs of said fourth and fifth controllable switching elements and applying a respective switch-off level to said fourth and fifth controllable switching elements at preset times depending on a power to be transmitted to said heater coil.

7. The circuit configuration according to claim 6, which further comprises:

a node connected between said fourth controllable switching element and said fifth controllable switching element; and a field-effect transistor forming a substrate diode being connected between the positive terminal of the supply voltage and said node connected between said fourth controllable switching element and said fifth controllable switching element, said substrate diode being polarized in the forward direction.

* * * * *